United States Patent [19]

O'Connor

[11] 4,062,273

[45] Dec. 13, 1977

[54] VENTILATION SYSTEM FOR A PASSENGER VEHICLE

[75] Inventor: Jon Francis O'Connor, Chicago, Ill.

[73] Assignee: Vapor Corporation, Chicago, Ill.

[21] Appl. No.: 647,372

[22] Filed: Jan. 8, 1976

[51] Int. Cl.² ............................ F24F 5/00; B60H 1/00
[52] U.S. Cl. ............................................. 98/8; 98/10; 98/14; 98/20; 98/33 R
[58] Field of Search ......................... 98/2.15, 8, 10, 14, 98/20, 32, 33 R, 49, 43 C, 40 D, 40 C, 43 R

[56] References Cited

U.S. PATENT DOCUMENTS

| 517,794 | 4/1894 | Cottier | 98/20 |
|---|---|---|---|
| 1,853,459 | 4/1932 | Russell et al. | 98/10 |
| 2,593,094 | 4/1952 | Blue | 98/10 |
| 2,593,094 | 4/1952 | Blue | 98/10 |
| 2,640,409 | 6/1953 | Hans | 98/10 |
| 3,151,538 | 10/1964 | Dean | 98/33 R |
| 3,159,089 | 12/1964 | Eggert, Jr. | 98/14 |
| 3,327,604 | 6/1967 | Stikkers et al. | 98/33 R |
| 3,352,224 | 11/1967 | Gillick | 98/14 |

Primary Examiner—John J. Camby
Assistant Examiner—Henry C. Yuen
Attorney, Agent, or Firm—Francis J. Lidd

[57] ABSTRACT

A ventilating system for a passenger vehicle including a ceiling mounted plenum chamber, a plurality of intake fans for pumping fresh air into the plenum chamber and being mounted in the ceiling, diffusers communicating with the plenum chamber for diffusing and distributing air along the side walls of the vehicle, a plurality of exhaust fans mounted in the ceiling for exhausting air from the vehicle, and exhaust outlets adjacent the floor of the vehicle for exhausting a part of the air being exhausted from the vehicle.

9 Claims, 4 Drawing Figures

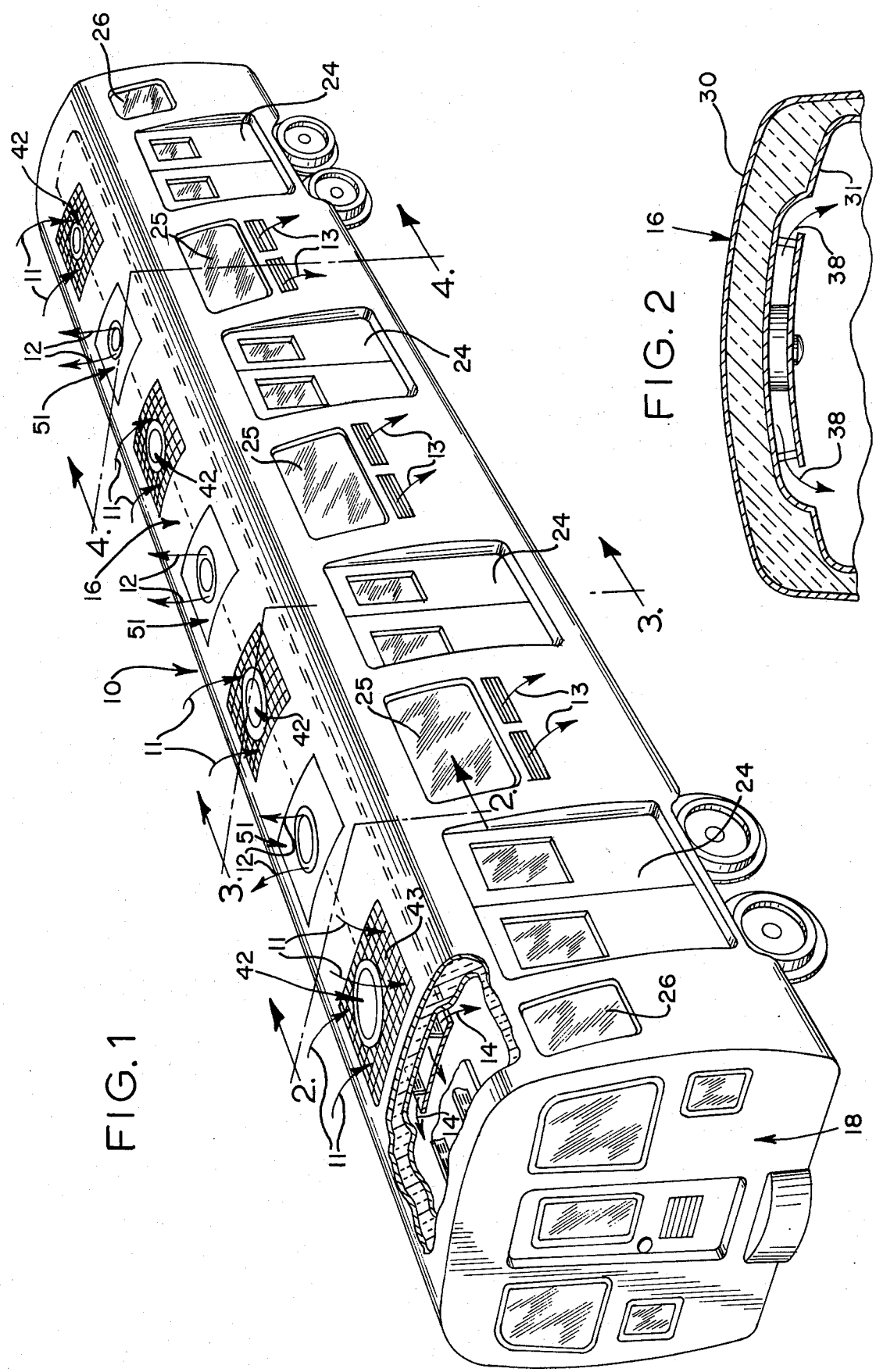

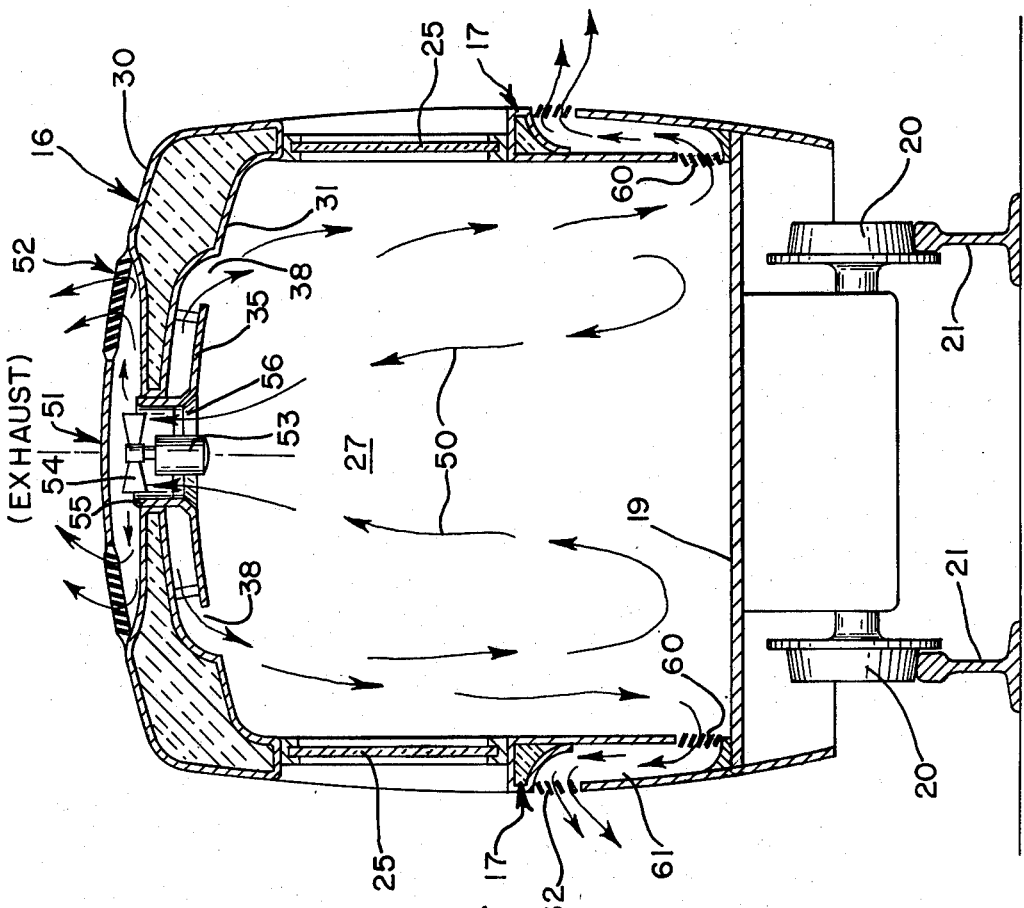
FIG. 3 (INTAKE)
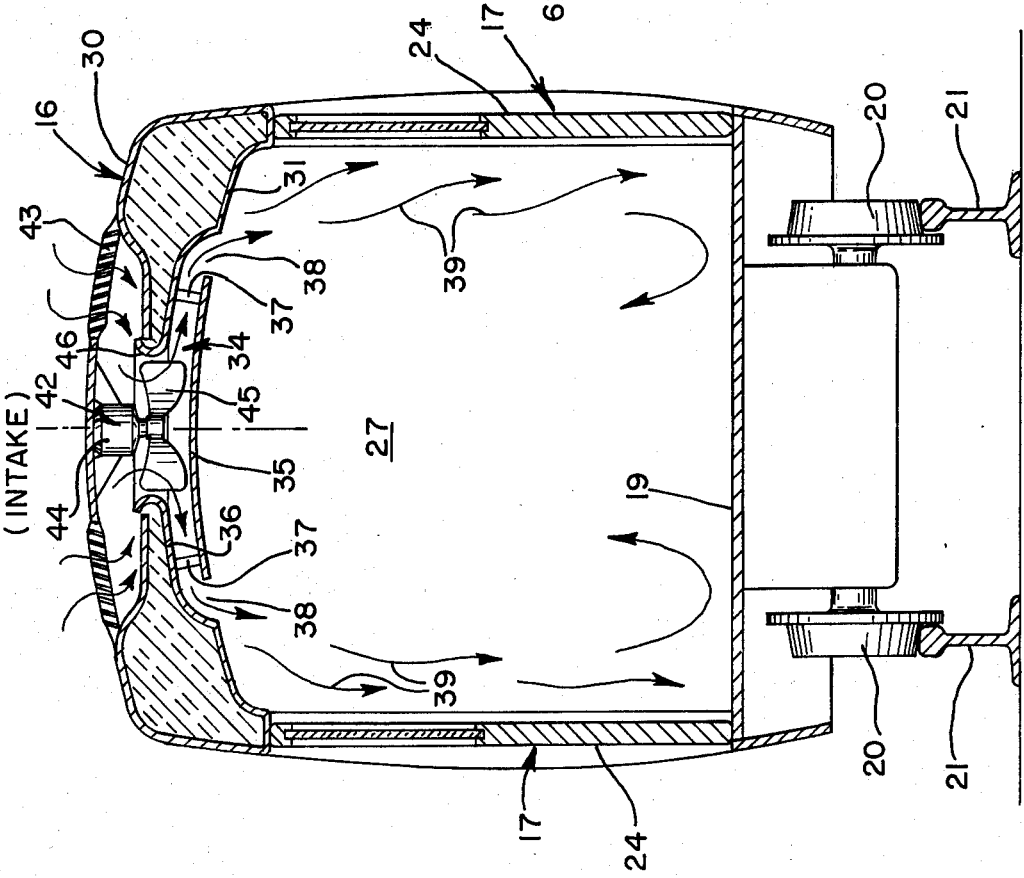
FIG. 4 (EXHAUST)

VENTILATION SYSTEM FOR A PASSENGER VEHICLE

This invention relates in general to a ventilating system for a passenger carrying vehicle, and more particularly, to a ventilating system for a rapid transit vehicle for producing a uniform air flow and exchange of air in the passenger compartment.

Heretofore, various ventilating systems have been developed and used for passenger carrying vehicles such as rapid transit vehicles, such as those shown in U.S. Pat. Nos. 3,237,545 and 3,327,604. However, difficulties have been encountered in obtaining uniform air distribution with adequate air exchange and maintaining high efficiency at the lowest possible cost.

The ventilation system of the present invention provides comfortable and adequate ventilation for a passenger compartment of a rapid transit vehicle such that efficient and uniform air distribution and air exchange is accomplished throughout the passenger compartment. The system includes a series of air intake and air exhaust fans mounted in the ceiling of the vehicle. Further, a plenum chamber extends along the entire length of the ceiling of the vehicle with diffuser outlets for distributing an air flow along the side walls of the vehicle. The air intake fans bring fresh air from the exterior of the vehicle into the plenum chamber, while the air exhaust fans remove air from the vehicle. Further, side wall exhaust vents adjacent the floor are provided for removing air from the vehicle. The air intake and exhaust fans are operated such as to maintain a positive or above atmospheric pressure within the passenger vehicle compartment so that a net exhaust air volume escapes through the side wall exhaust vents. Even distribution and exchange of air is accomplished by the plenum chamber which extends the length of the ceiling and which feeds air to the continuous diffusers along the plenum chamber.

Accordingly, it is an object of the present invention to provide a new and improved ventilating system for a passenger compartment of a vehicle such as a rapid transit car.

Another object of this invention is in the provision of an air ventilation system for a rapid transit car which provides comfortable and adequate ventilation wherein air is uniformly distributed and exchanged throughout the car by coacting spaced intake and exhaust fans in the car roof and exhaust vents near the floor.

Another object of the present invention is in the provision of an air distribution and air ventilation system which achieves uniform air flow around the passenger seats from spaced ceiling inlets and exhausts and side wall exhausts.

A still further object of the present invention is in the provision of a ventilation system for a rapid transit car which provides a net exhaust air volume at the floor level while exhausting air at the ceiling level.

A further object of the present invention is in the provision of a ventilation system for a rapid transit car capable of essentially maintaining constant ventilation and air distribution within the car during car operation in tunnels and at stations.

It is a further object of the present invention to provide an air ventilation system for a rapid transit car that maintains a low profile by mounting the exhaust and intake fans in the ceiling along with a plenum chamber and which obtains high efficiency, while at the same time maintaining low noise and thereby obtaining greater comfort for the passengers.

Other objects, features and advantages of the invention will be apparent from the following detailed disclosure, taken in conjunction with the accompanying sheets of drawings, wherein like reference numerals refer to like parts, in which:

FIG. 1 is a perspective view of a rapid transit vehicle having the air distribution and ventilation system according to the invention with some parts broken away to show internal parts for purposes of clarity and also with air flow arrows indicating air flow patterns;

FIG. 2 is a greatly enlarged fragmentary sectional view taken transversely of the car and substantially along line 2—2 of FIG. 1;

FIG. 3 is a greatly enlarged and a complete transverse sectional view taken through the car of FIG. 1 and substantially along lines 3—3 thereof; and FIG. 4 is a transverse sectional view similar to FIG. 3 but taken along line 4—4 of FIG. 1.

The air distribution and ventilation system of the invention is applicable to passenger carrying vehicles, and in particular to rapid transit rail cars which at least part of the time operate in underground tunnels.

The system includes a plenum chamber mounted along substantially the entire ceiling of the vehicle, air intake fans feeding fresh air from outside the vehicle into the plenum chamber, outlet diffusers communicating with the plenum chamber for washing the side walls of the vehicle with an air flow, exhaust fans mounted in the ceiling for exhausting air from within the vehicle to the exterior, and exhaust vents adjacent the floor of the vehicle for exhausting air to the exterior.

Referring now to the drawings, a rapid transit passenger carrying vehicle 10 is shown in FIG. 1 with air flow arrows 11 indicating the movement of air into the vehicle from the exterior, air flow arrows 12 indicating the exhausting of air from the vehicle through the roof structure of the vehicle, air flow arrows 13 indicating the exhausting of air through side wall exhaust vents for the vehicle, and air flow arrows 14 indicating the distribution of air within the vehicle. It will be appreciated the present invention can be utilized with any type of passenger carrying vehicle even though it is particularly adapted for use in a rapid transit car.

The vehicle 10 illustrated includes a roof or ceiling structure 16, opposed side walls 17, opposed end walls 18, and a floor 19. As seen particularly in FIGS. 3 and 4, the vehicle is supported by rail wheels 20 for riding on rails 21.

The side walls have mounted therein equally spaced apart doors 24 and equally spaced apart windows 25 between the doors. Additional windows 26 are provided in the side walls outside the opposite end doors. Each door 24 includes a set of door leaves that open and close for providing ingress and egress of passengers. Seats (not shown) are arranged within the vehicle so as not to interfere with the ingress and egress of passengers through the doors. Accordingly, seats would be provided adjacent all of the windows.

The ceiling structure, side walls and floor define a passenger compartment 27 which is ventilated by the system of the invention. The ventilation system encompasses both uniform air distribution and air exchange operations for the passenger compartment. As already explained, fresh air intake is accomplished through the roof structure 16. Further, primary exhaust of air is also accomplished through the ceiling structure 16, although some exhaust of air is accomplished through the side walls 17.

The roof structure 16 includes a roof 30 at the exterior of the vehicle and a ceiling 31 at the interior of the vehicle and exposed to the passenger compartment 27. The roof structure is constructed to define a plenum chamber 34 along the ceiling 31 and throughout substantially the entire length of the passenger compartment. The plenum chamber is defined by an elongated panel 35 defining a part of the ceiling and in spaced relation to an internal panel 36. Diffuser grills 37 guide the air flow from the plenum chamber 34 and through elongated continuous air discharge openings 38 so that the air flow pattern washes the side walls 17 as illustrated by the air flow arrows 39.

Fresh air is pumped into the plenum chamber 34 by air intake fan assemblies 42. As seen in FIG. 1, four such air intake fan assemblies equally spaced apart in the roof structure are provided, although it should be appreciated that any number of such assemblies may be used so that adequate fresh air is pumped substantially uniformly into the plenum chamber along its entire length. Each assembly includes an air intake grill 43 mounted flush with the roof 30 defining an air intake opening, an electric motor 44 suitably supported on the grill structure, a multi-bladed fan 45 driven by the motor 44 and arranged within a shroud 46. The fan is also partially arranged within the plenum chamber 34 and serves to pull or pump air through the intake grill 43 and to the plenum chamber 34. Accordingly, exterior air is brought into the plenum chamber by the air intake fan assemblies 42. It may be appreciated the intake grill 43 is rectangularly shaped on the outer periphery and circularly shaped on the inner periphery, as illustrated in FIG. 1.

Air is exhausted from the passenger compartment 27 along air flow paths as indicated by air flow arrows 50 in FIG. 4 through the roof structure 16 by means of a plurality of exhaust fan assemblies 51. As shown in FIG. 1, there are three exhaust fan assemblies 51 arranged alternately with the air intake fan assemblies 42 and equally spaced apart in the roof structure. It will be appreciated that any number of exhaust fan assemblies may be utilized depending upon the exhaust capacity needed for the passenger compartment. Each exhaust fan assembly includes an exhaust air grill 52 mounted flush with the roof 30 of the roof structure 16 and which is annular in shape and which defines an exhaust air opening. Within the roof structure 16, an electric motor 53 is suitably mounted to power a multi-bladed fan 54 within a shroud 55 extending through the plenum chamber and which opens to the passenger compartment through an opening 56. Accordingly, air is exhausted primarily from the passenger compartment 27 by means of a plurality of exhaust fan assemblies 51.

Further exhaust vents are provided for exhausting air from the passenger compartment through a plurality of exhaust grills or vents 60 mounted adjacent the floor 19 and beneath the windows 25. The exhaust vents 60 communicate with a chamber 61 formed in the side walls 17 which communicates with the exterior of the car through an external grill 62. Accordingly, exhaust air can pass from along the floor 19 through the exhaust vents 60 upwardly through the side wall chambers 61 and out through the external grills 62, as illustrated particularly in FIG. 4. Exhaust air thereby moves from the passenger compartment 27 through the side wall exhaust vents and through the roof mounted exhaust fan assemblies. The capacity of the air intake fan assemblies 42 exceeds the capacity of the exhaust fan assemblies 51 so that a positive or above atmospheric pressure is maintained at all times within the passenger compartment whereby exhaust air can be exhausted through the side wall vents. It may therefore be appreciated with the uniform distribution of fresh air from the plenum chamber along the entire length of the plenum chamber, together with the exhausting of air through the spaced exhaust fan assemblies in the roof structure and the partial exhausting of air through the spaced side wall exhaust vents, uniform air flow is established around the passenger seats within the passenger compartment. Further, a specified net exhaust air volume is vented at the floor level while air is also exhausted at the ceiling level due to the predetermined air flow capacities of the intake and exhaust fan assemblies. Whether the car is moving through tunnels or is at a station, an essentially constant ventilation and distribution of air is accomplished during car operation. The mounting of the air intake fan assemblies and the air exhaust fan assemblies in the roof structure provides a low profile air flow device for the vehicle. Mounting of the fan assemblies in the roof structure minimizes the noise at the passenger level. Accordingly, a highly efficient ventilation system is provided by the present invention.

It will be understood that modifications and variations may be effected without departing from the scope of the novel concepts of the present invention, but it is understood that this application is to be limited only by the scope of the appended claims.

The invention is hereby claimed as follows:

1. A ventilating system for a passenger carrying vehicle having a passenger compartment defined by side and end walls, a ceiling and roof thereover, and a floor, a plurality of generally equally spaced doors along each of the side walls, and a plurality of generally equally spaced window units along the side walls wherein a window unit is arranged between adjacent doors, said system comprising a plenum chamber mounted along the ceiling, a plurality of air intake fan assemblies mounted in the ceiling and equally spaced apart for pumping air from the atmosphere into the plenum chamber, said chamber having air diffuser outlets in the ceiling along opposite sides to distribute an air flow along substantially the entire length of the side walls, and a plurality of exhaust fan assemblies mounted along the ceiling intermediate adjacent intake fan assemblies and equally spaced apart for exhausting air from the passenger compartment, said exhaust fan assemblies including air passage means extending through and isolated from said plenum chamber whereby air drawn through the exhaust fan assemblies will not mix with air in the plenum chamber.

2. A ventilating system as defined in claim 1, wherein the system further includes exhaust vents in the side walls.

3. A ventilating system as defined in claim 2, wherein the exhaust vents in the side walls are arranged below the window units.

4. A ventilating system as defined in claim 2, wherein said air intake and exhaust fan assemblies coact to maintain a positive or above atmospheric pressure in the passenger compartment to cause a net exhaust of air at the exhaust vents in the side walls.

5. A ventilating system as defined in claim 4, wherein the exhaust vents in the side walls are arranged below the window units.

6. A ventilating system as defined in claim 1, wherein the intake and exhaust fan assemblies are longitudinally aligned and alternately arranged.

7. A ventilating system for a passenger carrying vehicle having a passenger compartment defined by side and end walls, a ceiling and roof thereover, and a floor, a plurality of generally equally spaced doors along each of the side walls, and a plurality of generally equally spaced window units along the side walls wherein a window unit is arranged between adjacent doors, said system comprising a plenum chamber mounted along the ceiling, a plurality of equally spaced apart outside atmospheric air intake fan assemblies communicating said plenum and said outside air mounted in the ceiling having air intake openings in the roof for pumping said air from the atmosphere into the plenum chamber, said chamber having air diffuser outlets in the ceiling along opposite sides to distribute outside atmosphere air flow along substantially the entire length of the side walls, and means for exhausting air from the passenger compartment including a plurality of equally spaced apart exhaust fan assemblies mounted along the ceiling in locations intermediate adjacent intake fan assemblies and having exhaust air openings in the roof, and exhaust vents in the side walls arranged below said window units, said exhaust fan assemblies including air passage means isolating said exhaust fan assemblies from said plenum chamber, and said exhaust vents including ducts in the side walls, inlet openings at the side walls adjacent the floor communicating said ducts and the passenger compartment, and outlet openings communicating said ducts and the atmosphere and spaced above the inlet openings.

8. A ventilating system for a passenger carrying vehicle having a passenger compartment defined by side and end walls, a ceiling and roof thereover, and a floor, a plurality of generally equally spaced doors along each of the side walls, and a plurality of generally equally spaced window units along the side walls wherein a window unit is arranged between adjacent doors, said system comprising a plenum chamber mounted along the ceiling, a plurality of air intake fan assemblies mounted in the ceiling and equally spaced apart for pumping air from the atmosphere into the plenum chamber, said chamber having air diffuser outlets in the ceiling along opposite sides to distribute an air flow along substantially the entire length of the side walls, a plurality of exhaust fan assemblies mounted along the ceiling intermediate adjacent intake fan assemblies and equally spaced apart for exhausting air from the passenger compartment, said exhaust fan assemblies including air passage means isolated from said plenum chamber, and exhaust vents in the side walls arranged below the window units, said exhaust vents including ducts in the side walls, inlet openings from the passenger compartment to the ducts along the floor, and outlet openings communicating said ducts and the atmosphere and spaced above the inlet openings.

9. A ventilating system for a passenger carrying vehicle having a passenger compartment defined by side and end walls, a ceiling and roof thereover, and a floor, a plurality of generally equally spaced doors along each of the side walls, and a plurality of generally equally spaced window units along the side walls wherein a window unit is arranged between adjacent doors, said system comprising a plenum chamber mounted along the ceiling, a plurality of air intake fan assemblies mounted in the ceiling and equally spaced apart for pumping air from the atmosphere into the plenum chamber, said chamber having air diffuser outlets in the ceiling along opposite sides to distribute an air flow along substantially the entire length of the side walls, a plurality of exhaust fan assemblies mounted along the ceiling intermediate adjacent intake fan assemblies and equally spaced apart for exhausting air from the passenger compartment, said exhaust fan assemblies including air passage means isolated from said plenum chamber, exhaust vents in the side walls, said air intake and exhaust fan assemblies coacting to maintain a positive or above-atmospheric pressure in the passenger compartment to cause a net exhaust of air at the exhaust vents in the side walls, said exhaust vents being arranged below the window units and including ducts in the side walls, inlet openings for the ducts arranged along the floor, and outlet openings for the ducts spaced above the inlet openings.

* * * * *